(12) United States Patent
Xia

(10) Patent No.: US 10,768,960 B2
(45) Date of Patent: Sep. 8, 2020

(54) METHOD FOR AFFINITY BINDING OF INTERRUPT OF VIRTUAL NETWORK INTERFACE CARD, AND COMPUTER DEVICE

(71) Applicant: Huawei Technologies Co., Ltd., Shenzhen (CN)

(72) Inventor: Hai Xia, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 194 days.

(21) Appl. No.: 15/187,458

(22) Filed: Jun. 20, 2016

(65) Prior Publication Data

US 2016/0306647 A1 Oct. 20, 2016

Related U.S. Application Data

(63) Continuation of application No. PCT/CN2014/093686, filed on Dec. 12, 2014.

(30) Foreign Application Priority Data

Dec. 20, 2013 (CN) .......................... 2013 1 0716755

(51) Int. Cl.
*G06F 9/455* (2018.01)
*G06F 9/46* (2006.01)
(Continued)

(52) U.S. Cl.
CPC ...... *G06F 9/45558* (2013.01); *G06F 9/45537* (2013.01); *G06F 9/4812* (2013.01);
(Continued)

(58) Field of Classification Search
None
See application file for complete search history.

(56) References Cited

U.S. PATENT DOCUMENTS 6,738,847 B1* 5/2004 Beale ...................... G06F 13/24
710/260
7,958,506 B2* 6/2011 Mann ..................... G06F 9/4418
718/1
(Continued)

FOREIGN PATENT DOCUMENTS

CN 101051266 A 8/2007
CN 101470635 A 7/2009
(Continued)

OTHER PUBLICATIONS

Dong et al., "Optimizing Network I/O Virtualization with Efficient Interrupt Coalescing and Virtual Receive Side Scaling," 2011 IEEE International Conference on Cluster Computing, pp. 26-34, Institute of Electrical and Electronics Engineers, New York, New York (2011).

(Continued)

*Primary Examiner* — Bradley A Teets
(74) *Attorney, Agent, or Firm* — Leydig, Voit & Mayer, Ltd.

(57) ABSTRACT

The present invention discloses a method for affinity binding of interrupt of a virtual network interface card, and a computer device. The method includes: receiving a request message sent by an IaaS resource management system, where the request message carries an interrupt affinity policy parameter of a virtual network interface card; performing one-to-one correspondence affinity binding between multiple virtual central processing units VCPUs and multiple physical central processing units PCPUs; performing affinity binding between a virtual interrupt of the virtual network interface card and a VCPU; and performing affinity binding between a physical interrupt of the virtual network interface card and a corresponding PCPU according to the affinity policy parameter.

7 Claims, 11 Drawing Sheets

(51) Int. Cl.
*G06F 9/48* (2006.01)
*G06F 9/50* (2006.01)
*H04L 12/46* (2006.01)

(52) U.S. Cl.
CPC ........ *G06F 9/5077* (2013.01); *H04L 12/4641* (2013.01); *G06F 2009/45579* (2013.01); *G06F 2009/45595* (2013.01)

(56) References Cited

U.S. PATENT DOCUMENTS

| | | | |
|---|---|---|---|
| 8,738,860 B1 * | 5/2014 | Griffin | G06F 12/0897 711/122 |
| 2004/0205272 A1 | 10/2004 | Armstrong et al. | |
| 2005/0097226 A1 * | 5/2005 | Tripathi | G06F 13/22 709/250 |
| 2008/0019365 A1 * | 1/2008 | Tripathi | H04L 12/4641 370/392 |
| 2009/0070551 A1 | 3/2009 | Kaushik et al. | |
| 2009/0089351 A1 * | 4/2009 | Belgaied | H04L 49/90 709/201 |
| 2009/0183153 A1 | 7/2009 | Wang et al. | |
| 2010/0138208 A1 | 6/2010 | Hattori et al. | |
| 2010/0191887 A1 | 7/2010 | Serebrin | |
| 2010/0312868 A1 | 12/2010 | Das et al. | |
| 2011/0202699 A1 | 8/2011 | Van Riel | |
| 2013/0104127 A1 | 4/2013 | Domsch et al. | |
| 2014/0280437 A1 * | 9/2014 | Eder | H04L 67/10 709/201 |

FOREIGN PATENT DOCUMENTS

| | | |
|---|---|---|
| CN | 103699428 A | 4/2014 |
| JP | 2004303237 A | 10/2004 |
| JP | 2008107896 A | 5/2008 |
| JP | 2010128911 A | 6/2010 |
| JP | 2010538373 A | 12/2010 |
| JP | 2012515995 A | 7/2012 |
| JP | 2012529092 A | 11/2012 |

OTHER PUBLICATIONS

Liu et al., "Virtualization Polling Engine (VPE): Using Dedicated CPU Cores to Accelerate I/O Virtualization," Proceedings of the 23$^{rd}$ international conference on Supercomputing, pp. 225-234, ACM, New York, New York (Jun. 8-12, 2009).

* cited by examiner

METHOD FOR AFFINITY BINDING OF INTERRUPT OF VIRTUAL NETWORK INTERFACE CARD, AND COMPUTER DEVICE

CROSS-REFERENCE TO RELATED APPLICATIONS

This application is a continuation of International Application No. PCT/CN2014/093686, filed on Dec. 12, 2014, which claims priority to Chinese Patent Application No. 201310716755.7, filed on Dec. 20, 2013, both of which are hereby incorporated by reference in their entireties.

TECHNICAL FIELD

The present invention relates to the field of communications technologies, and in particular, to a method for affinity binding of an interrupt of a virtual network interface card, and a computer device.

BACKGROUND

A telecommunications service is generally a computing network-intensive application, and there are a quite large number of overheads of software and hardware interrupt processing used by a CPU to process packet sending and receiving of a network interface card (for example, a 512-byte UDP packet is received and sent on a gigabit network interface card at a fixed rate of 300 Mbps, and overheads of software and hardware interrupt processing of the gigabit network interface card may reach 30% of single-core CPU usage).

In a physical machine scenario, for a multi-core processor, when and on which CPU interrupt processing of a network interface card runs can be controlled by setting affinity binding between an interrupt of a physical network interface card and a physical CPU. In this way, a telecommunications service program can precisely control an interrupt processing policy of the network interface card as required, so as to avoid unpredictable interference to running of the service program.

With continuous promotion of a concept of cloud computing, running a telecommunications service on a virtual machine has become a general trend. To meet requirements of reliability and predictability of running the telecommunications service on the virtual machine, a virtualization platform also needs to be capable of precisely controlling the interrupt processing policy of the network interface card, so as to avoid unpredictable interference to running of a service program and a program of an adjacent virtual machine that shares a physical machine with the virtual machine.

As shown in FIG. 1, after a virtual machine is introduced, interrupt packet sending and receiving processing of a virtual network interface card (VNIC, Virtual Network Interface Card) is divided into two stages: First, a physical interrupt of the virtual network interface card sends a packet to a host operating system (Host Operating System, Host OS) that runs on a physical machine; then, the Host OS distributes the packet to the virtual machine (Virtual Machine, VM) so as to trigger a virtual interrupt of the virtual network interface card, and then a guest operating system (Guest Operating System, Guest OS) that runs on the virtual machine processes packet sending and receiving of the virtual interrupt of the virtual network interface card. In a process of transfer from the physical interrupt of the virtual network interface card to the virtual interrupt of the virtual network interface card, there is no fixed correspondence by default for a physical CPU to which the physical interrupt of the virtual network interface card sends the packet for processing, and a virtual CPU to which the virtual interrupt of the virtual network interface card sends the packet for processing, and there is no fixed correspondence between a physical CPU and a virtual CPU either.

If there is no definite scheduling policy for interrupt packet sending and receiving processing of the virtual network interface card, impact of the interrupt packet sending and receiving of the virtual network interface card cannot be predicted in a virtual machine environment. As shown in FIG. 2, it is assumed that an application 3 (Application 3, APP3) of a VM1 is a process responsible for network packet sending and receiving and runs on a VCPU3 (Virtual Central Processing Unit, virtual central processing unit), and that the VCPU3 is scheduled to run on a PCPU3 (Physical Central Processing Unit, physical central processing unit 3). If there is no definite policy control, packet sending and receiving processing of a physical interrupt that is of the virtual network interface card and corresponding to the APP3 may occur on a PCPU2, and packet sending and receiving processing of a virtual interrupt of the virtual network interface card may occur on a VCPU1, and consequently, interference is caused respectively to an APP2 that runs on a VCPU2 and an APP1 that runs on the VCPU1. In addition, if there is no definite policy control on packet sending and receiving of the physical and virtual interrupts of the virtual network interface card, it is also likely to cause adjacent interference between VMs that share a physical machine. As shown in FIG. 2, it is assumed that an APP5 of a VM2 is a process responsible for network packet sending and receiving and runs on a VCPU5, and the VCPU5 is scheduled to run on a PCPU5, corresponding physical interrupt processing of the physical network interface card may be on a PCPU4, and interference is caused to an APP4 of the VM1.

For a telecommunications system, because there are a large number of overheads of software and hardware interrupt processing of a network interface card, the overheads of the software and hardware interrupt processing of the network interface card need to be precisely controlled, so that it is implemented that interrupt packet sending and receiving processing of a network interface card between virtual machines that share a physical machine does not interfere with each other, and within a virtual machine, it needs to be implemented that interrupt processing of a network interface card in the virtual machine imposes no interference between VCPUs.

SUMMARY

To resolve the technical problems, embodiments of the present invention provide a method for implementing a setting of an interrupt affinity policy of a virtual network interface card, and a computer device, which implements that processing of interrupts of the virtual network interface card does not interfere with each other.

A method for affinity binding of an interrupt of a virtual network interface card in an embodiment of the present invention includes:

receiving a request message sent by an IaaS resource management system, where the request message carries an interrupt affinity policy parameter of a virtual network interface card;

performing one-to-one correspondence affinity binding between multiple virtual central processing units VCPUs and multiple physical central processing units PCPUs;

performing affinity binding between a virtual interrupt of the virtual network interface card and a VCPU; and performing affinity binding between a physical interrupt of the virtual network interface card and a corresponding PCPU according to the affinity policy parameter.

Specifically, when the virtual interrupt of the virtual network interface card is in affinity binding with a first VCPU of the multiple VCPUs, binding is performed between the physical interrupt of the virtual network interface card and a first PCPU of the multiple PCPUs according to the policy parameter, where the first VCPU is a VCPU in affinity binding with the first PCPU.

The method further includes: when the virtual interrupt of the virtual network interface card changes to be in affinity binding with a second VCPU, performing binding between the physical interrupt of the virtual network interface card and a second PCPU, where the second VCPU is a VCPU in affinity binding with the second PCPU.

The performing affinity binding between a physical interrupt of the virtual network interface card and a corresponding PCPU according to the policy parameter specifically includes:

performing affinity binding between the physical interrupt of the virtual network interface card and an idle PCPU according to the policy parameter; or performing, according to the policy parameter, affinity binding between the physical interrupt of the virtual network interface card and a reserved PCPU that is used to process the physical interrupt of the virtual network interface card.

A computer device in an embodiment of the present invention includes:

a receiving module, configured to receive a request message sent by an IaaS resource management system, where the request message carries an interrupt affinity policy parameter of a virtual network interface card;

a first binding module, configured to: perform one-to-one correspondence affinity binding between multiple virtual central processing units VCPUs and multiple physical central processing units PCPUs; and perform affinity binding between a virtual interrupt of the virtual network interface card and a VCPU; and a second binding module, configured to: after the first binding module performs affinity binding between the virtual interrupt of the virtual network interface card and the VCPU, perform affinity binding between a physical interrupt of the virtual network interface card and a corresponding PCPU according to the affinity policy parameter.

The computer device further includes:

a capturing module, configured to: capture an operation of performing, by the first binding module, affinity binding between the virtual interrupt of the virtual network interface card and the VCPU or changing affinity binding; and instruct the second binding module to perform affinity binding between the physical interrupt of the virtual network interface card and the corresponding PCPU; where the second binding module is further configured to perform affinity binding between the physical interrupt of the virtual network interface card and the corresponding PCPU according to a notification of the capturing module, where the corresponding PCPU is a PCPU in one-to-one correspondence affinity binding with the VCPU.

That the second binding module performs affinity binding between a physical interrupt of the virtual network interface card and a corresponding PCPU specifically includes:

performing, by the second binding module, affinity binding between the physical interrupt of the virtual network interface card and an idle PCPU; or performing, by the second binding module, affinity binding between the physical interrupt of the virtual network interface card and a reserved PCPU that is used to process the physical interrupt of the virtual network interface card.

By using the technical solutions in the embodiments of the present invention, three affinity binding relationships between a virtual interrupt and a VCPU, between a physical interrupt and a PCPU, and between a corresponding VCPU and a PCPU of a same virtual network interface card are consistent, so that no interference is caused to an APP that runs on another VCPU, and no interference is caused either to an APP that runs on another virtual machine on a same computer device. In addition, the physical interrupt of the virtual network interface card is automatically scheduled in a balanced manner by a Host OS according to load statuses of PCPUs, so that an idle PCPU can be used more flexibly to avoid a waste of PCPU resources. In addition, a VCPU of a virtual machine may not be scheduled on a dedicated PCPU, and the physical interrupt of the virtual network interface card is bound to the dedicated PCPU, thereby simplifying a scheduling operation and avoiding interference to an APP that runs on another VCPU.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1:
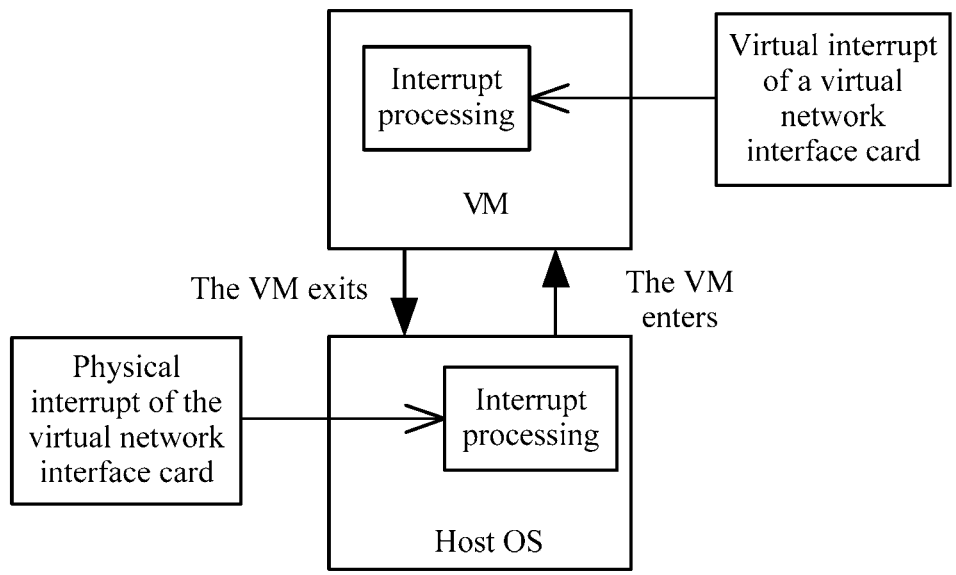
FIG. 1 is a schematic diagram of an interrupt of a virtual network interface card in the prior art.
Figure 2:
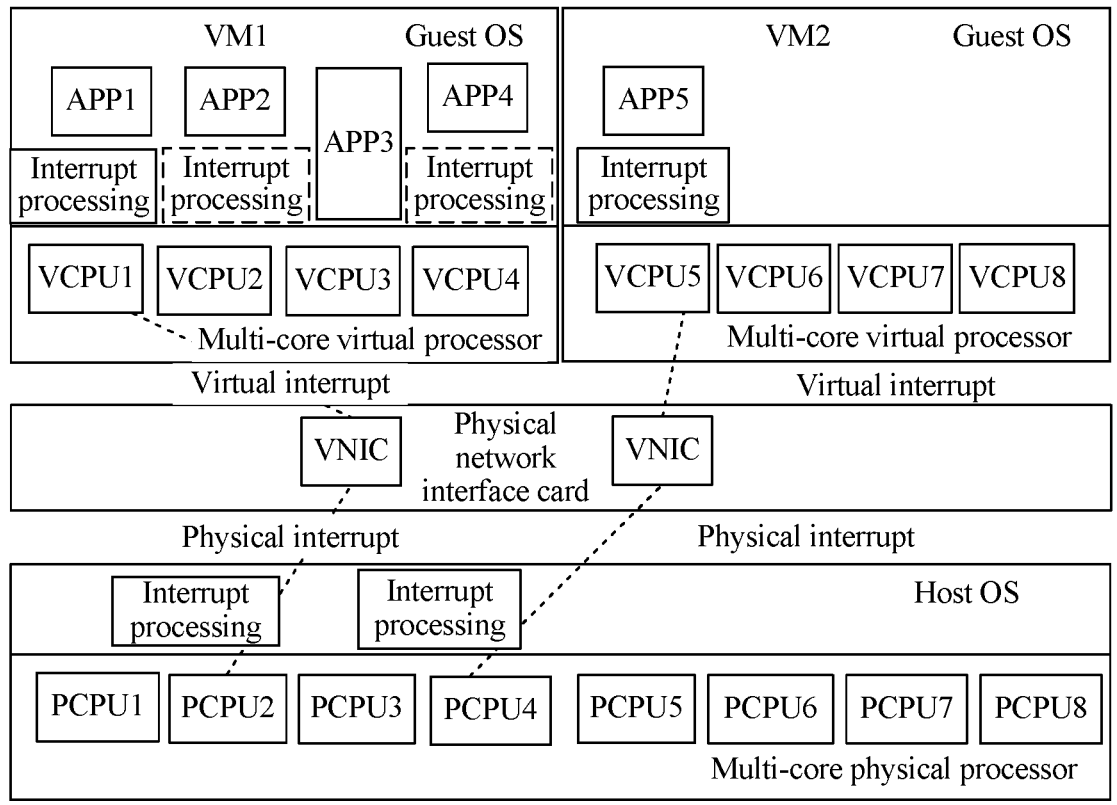
FIG. 2 is a schematic diagram of processing of a virtual interrupt and a physical interrupt of a virtual network interface card in the prior art.
Figure 3:
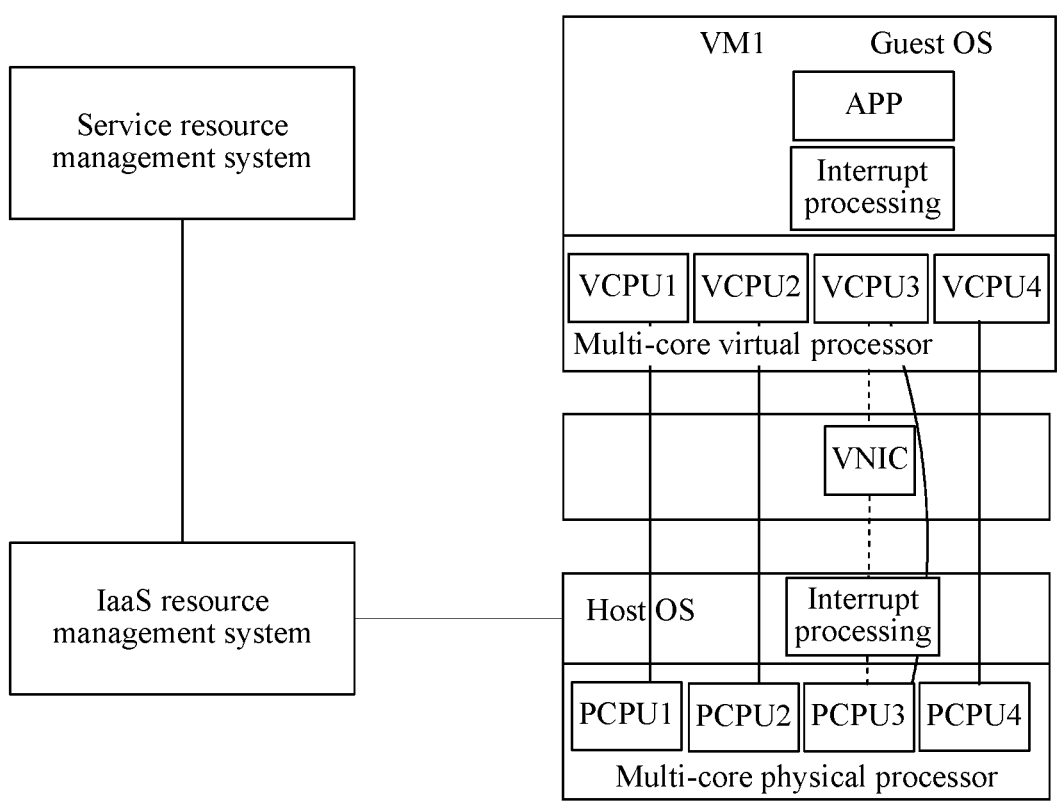
FIG. 3 is a diagram of a system architecture for affinity binding of an interrupt of a virtual network interface card according to the present invention.

As shown in a diagram of a system architecture in FIG. 3, the system architecture mainly includes: a service resource management system, an infrastructure as a service (Infrastructure as a Service, IaaS) resource management system, and a computer device that provides a running environment for a virtual machine; the computer device may be, for example, a physical machine.

A main function of the service resource management system applies to the IaaS resource management system for a virtual machine according to a running resource requirement of a specific service, and an interrupt affinity policy parameter of a virtual network interface card is carried.

A main function of the IaaS resource management system selects, according to a virtual machine resource requirement sent from the service resource management system, an idle computer device that meets the requirement; and instructs the selected computer device to create a corresponding virtual machine, where the virtual machine refers to software implementation of a computer that can run a program in a same way as a real machine, and the virtual machine includes multiple virtual central processing units VCPUs, a corresponding operating system (Guest OS), and an application (App). The computer device includes multiple physical central processing units PCPUs. A Host OS runs on a physical machine, and a Guest OS runs on the virtual machine.

A specific procedure is as follows: The computer device receives a request message sent by the IaaS resource management system, where the request message carries an interrupt affinity policy parameter of a virtual network interface card;

the computer device performs one-to-one correspondence affinity binding between the multiple virtual central processing units VCPUs and the multiple physical central processing units PCPUs, and performs affinity binding between a virtual interrupt of the virtual network interface card and a VCPU; and the computer device performs affinity binding between a physical interrupt of the virtual network interface card and a corresponding PCPU according to the affinity policy parameter.

Affinity binding between the VCPUs and the PCPUs refers to a binding relationship based on which a PCPU on which a VCPU is scheduled to run is determined, for example, one-to-one correspondence affinity binding between a VCPU1 and a PCPU1 indicates that the VCPU1 is scheduled to run on the PCPU1 instead of running on another PCPU.

Affinity binding of an interrupt of the virtual network interface card includes affinity binding of a physical interrupt of the virtual network interface card and affinity binding of a virtual interrupt of the virtual network interface card. The affinity binding of the physical interrupt of the virtual network interface card refers to that after the physical interrupt of the virtual network interface card is generated, the Host OS on the computer device sends the physical interrupt to a PCPU in affinity binding with the physical interrupt for processing. The affinity binding of the virtual interrupt of the virtual network interface card refers to that after the virtual interrupt of the virtual network interface card is generated, the Guest OS on the computer device distributes the virtual interrupt to a VCPU in affinity binding with the virtual interrupt for processing.

The affinity policy parameter is set as different parameters by the service resource management system according to different specific service scenarios, and these different parameters separately instruct the Host OS to execute different affinity binding policies, which specifically include an automatic following policy, an automatic balancing policy, an automatically exclusive policy, and the like.

According to the solution of the present invention, an infrastructure as a service IaaS resource management system provides a general function of configuring a scheduling policy of interrupt packet sending and receiving processing of a virtual network interface card, so that when creating a virtual machine, a computer device can perform corresponding binding and scheduling on an interrupt of the virtual network interface card according to an interrupt affinity policy parameter sent by the IaaS resource management system, thereby implementing configuration automation.

Embodiment 1

Figure 4A:
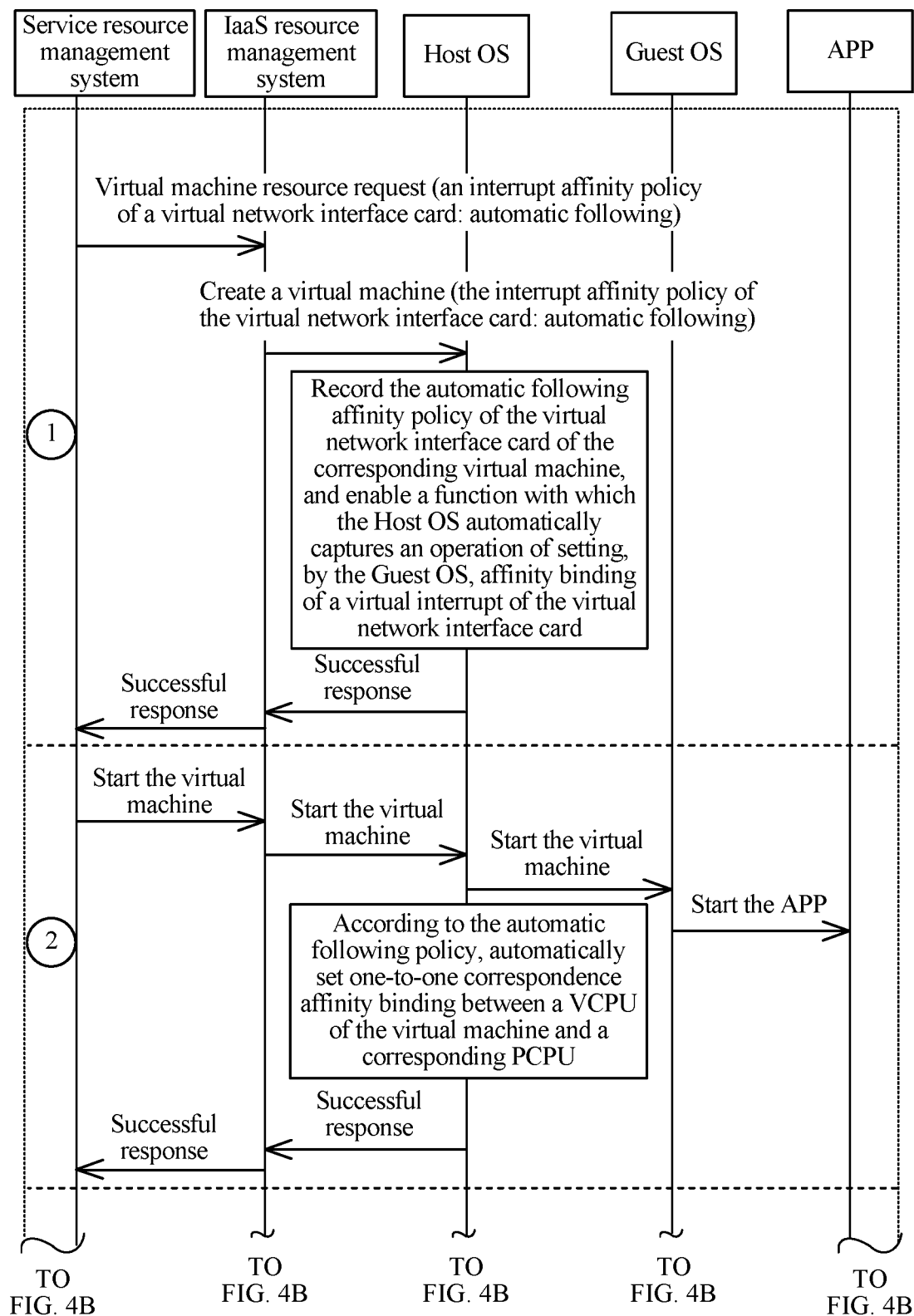
FIG. 4A and FIG. 4B are a flowchart of affinity binding of an interrupt of a virtual network interface card according to Embodiment 1 of the present invention.
Figure 4B:
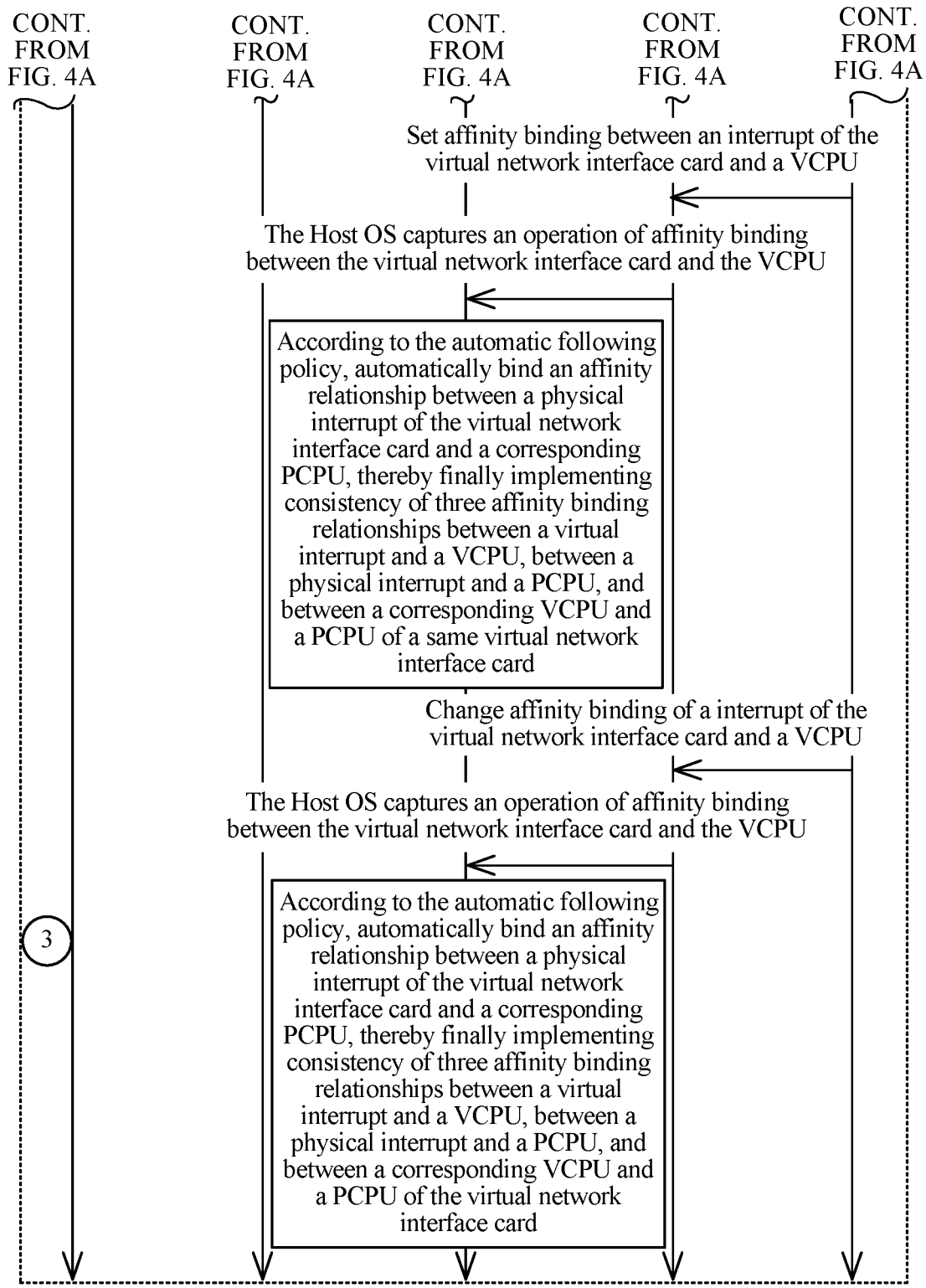

When an affinity policy parameter is set as an automatic following policy, an interrupt affinity policy parameter of a virtual network interface card indicates that affinity binding between a physical interrupt and a PCPU follows a change of affinity binding between a virtual interrupt and a VCPU. As shown in FIG. 4A and FIG. 4B, a method for affinity binding of an interrupt of a virtual network interface card mainly includes steps ①, ②, and ③, which are specifically as follows:

Step ① mainly includes the following three substeps:

A service resource management system initiates a virtual machine resource request, where an interrupt affinity policy parameter of a virtual network interface card in the virtual machine resource request is automatic following.

After receiving the request, an IaaS resource management system finds a computer device that meets a resource requirement, and initiates a request for creating a virtual machine to a Host OS that runs on the computer device, where the request carries an automatic following interrupt affinity policy of the virtual network interface card.

The Host OS records the automatic following affinity policy of the virtual network interface card of the corresponding virtual machine, and enables an automatic capturing function with which an operation of setting, by a Guest OS in the virtual machine, affinity binding of a virtual interrupt of the virtual network interface card can be captured.

Step ② mainly includes the following two substeps:

The service resource management system initiates a request for starting the virtual machine, and after receiving the request, the IaaS resource management system initiates a request for starting the corresponding virtual machine to a Host OS that runs on a corresponding computer device.

Figure 5:
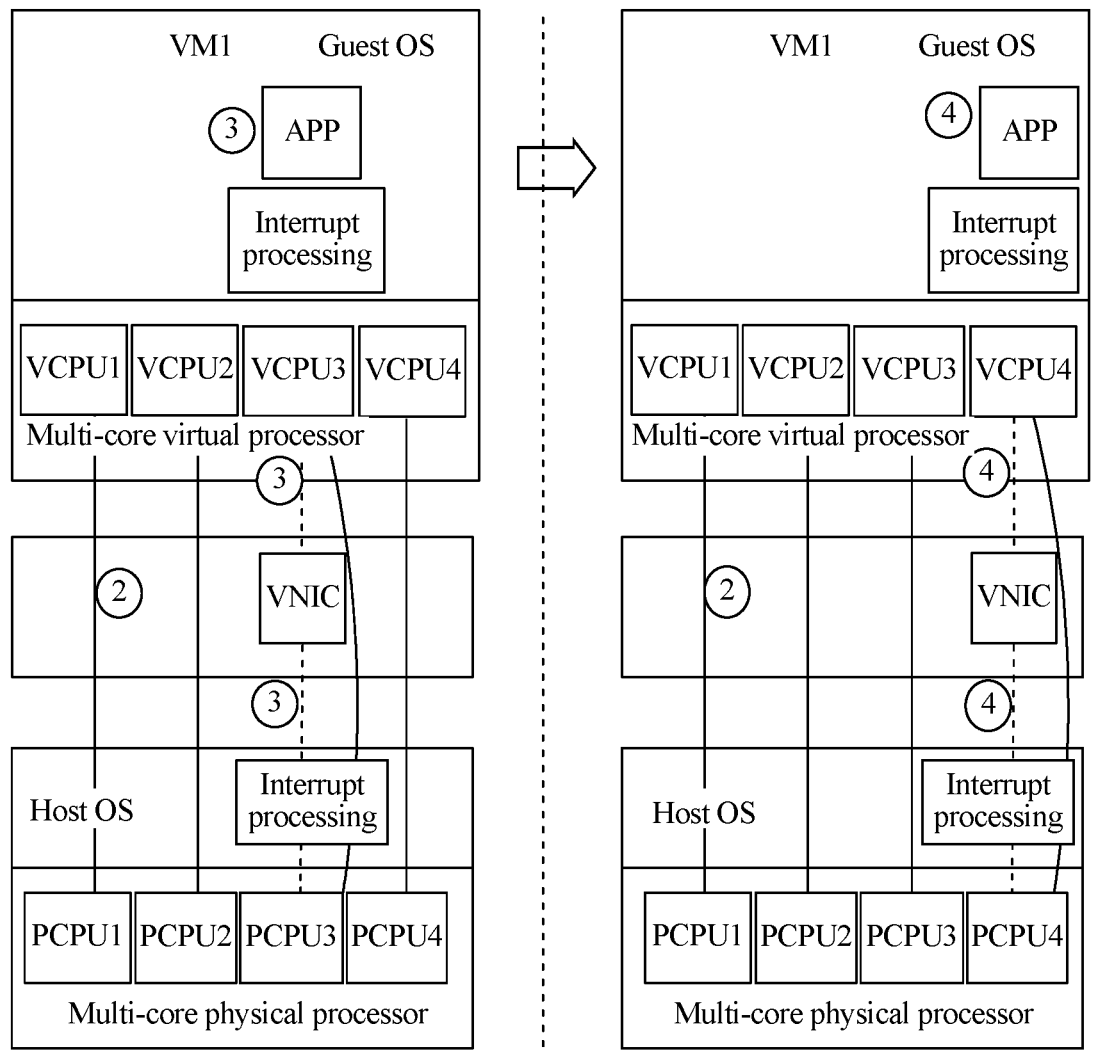
FIG. 5 is schematic block diagram of affinity binding of an interrupt of a virtual network interface card according to Embodiment 1 of the present invention.

After the virtual machine is started, the Guest OS runs, and after the Guest OS runs, an APP runs, where after the virtual machine is started, the Host OS automatically sets one-to-one correspondence affinity binding between a VCPU of the virtual machine and a corresponding PCPU (as shown in FIG. 5, one-to-one correspondence affinity binding is respectively performed between VCPU1 to VCPU4 and PCPU1 to PCPU4).

Step ③ mainly includes the following two substeps:

The Guest OS that runs on the virtual machine sets affinity binding between the virtual interrupt of the virtual network interface card and a VCPU, or changes affinity binding between the virtual interrupt of the virtual network interface card and a VCPU.

The automatic capturing function enabled by the Host OS captures an operation of setting or changing, by the Guest OS in the foregoing virtual machine, the affinity binding of the virtual interrupt of the virtual network interface card, and automatically binds an affinity binding relationship between a physical interrupt of the virtual network interface card and a corresponding PCPU according to the automatic following policy, where the corresponding PCPU is a PCPU in one-to-one corresponding affinity binding with the VCPU.

A specific procedure of the automatically binding an affinity binding relationship between a physical interrupt of the virtual network interface card and a corresponding PCPU is as follows: The Host OS finds a corresponding virtual interrupt number of the virtual network interface card according to the virtual interrupt of the virtual network interface card, finds a corresponding physical interrupt number according to the virtual interrupt number (a virtual interrupt number and a physical interrupt number of a same virtual network interface card are in a one-to-one correspondence), and further determines a corresponding physical interrupt; the Host OS determines a corresponding PCPU according to a one-to-one correspondence affinity binding relationship between the VCPU and the PCPU, so as to perform binding between the physical interrupt of the virtual network interface card and the corresponding PCPU, thereby implementing consistency of three affinity binding relationships between a virtual interrupt and a VCPU, between a physical interrupt and a PCPU, and between a corresponding VCPU and a PCPU of a same virtual network interface card.

The Guest OS that runs on the virtual machine sets or changes the affinity binding relationship between the virtual interrupt of the virtual network interface card and the VCPU, and the Host OS captures the operation and follows to bind the physical interrupt of the virtual network interface card and the corresponding PCPU. This manner is the automatic following policy.

Step ③ may be indicated by using a schematic block diagram in FIG. 5, and ②, ③, and ④ in the figure are corresponding to the foregoing steps ② and ③, where the right figure (on the right of the dotted line in the figure) indicates that when the affinity binding relationship between the virtual interrupt of the virtual network interface card and the VCPU changes (from a VCPU3 to a VCPU4), the Host OS may automatically follow to bind the affinity relationship between the physical interrupt of the virtual network interface card and the corresponding PCPU, to perform affinity binding between the physical interrupt of the virtual network interface card and the PCPU4, where the VCPU4 is in affinity binding with the PCPU4.

It may be learned from the foregoing procedure that when an automatic following policy is used, three affinity binding relationships between a virtual interrupt and a VCPU, between a physical interrupt and a PCPU, and between a corresponding VCPU and a PCPU of a same virtual network interface card are consistent, so that no interference is caused to an APP that runs on another VCPU, and no interference is caused either to an APP that runs on another virtual machine on a same computer device.

Embodiment 2

Figure 6A:
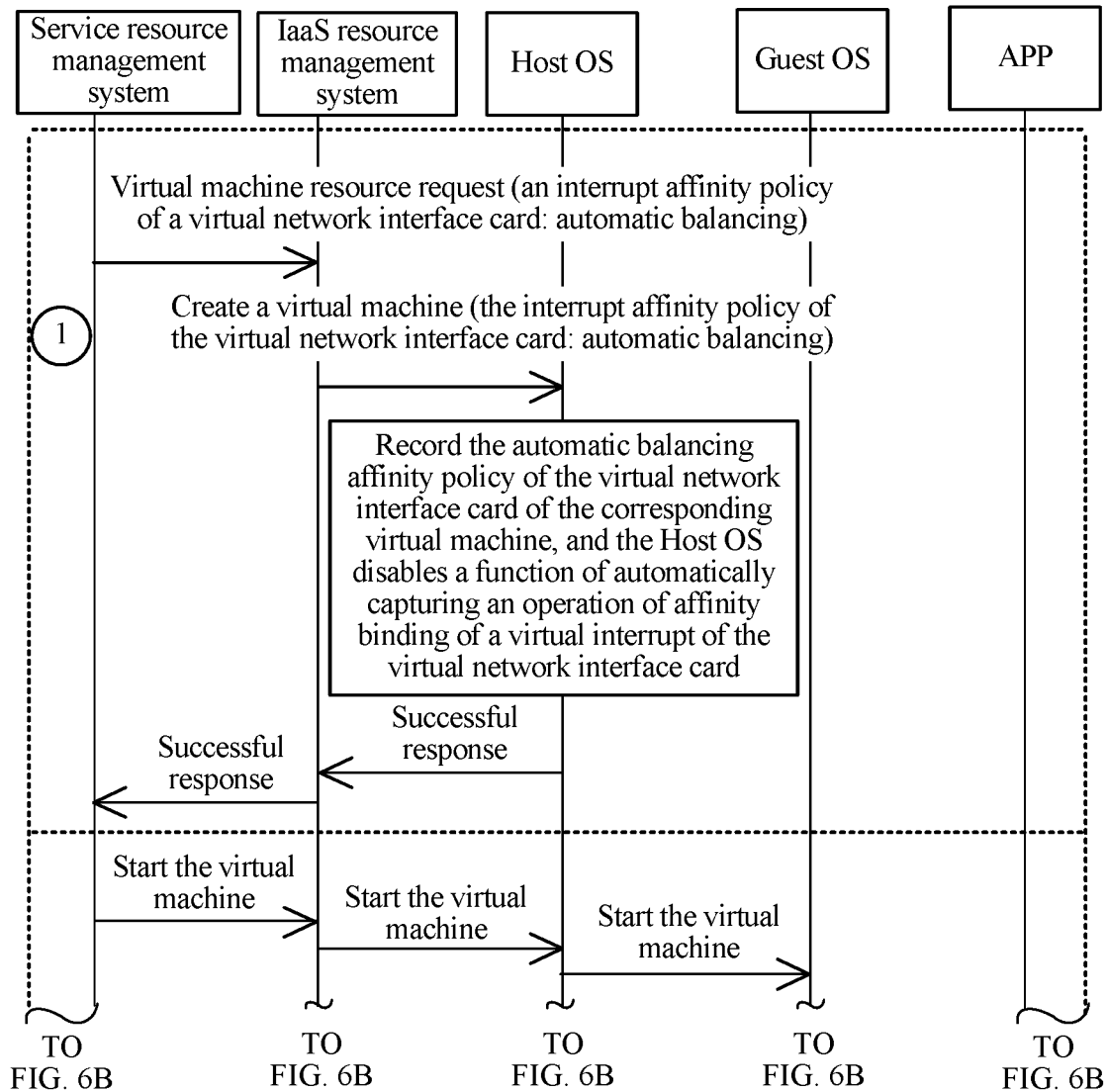
FIG. 6A and FIG. 6B are a flowchart of affinity binding of an interrupt of a virtual network interface card according to Embodiment 2 of the present invention.
Figure 6B:
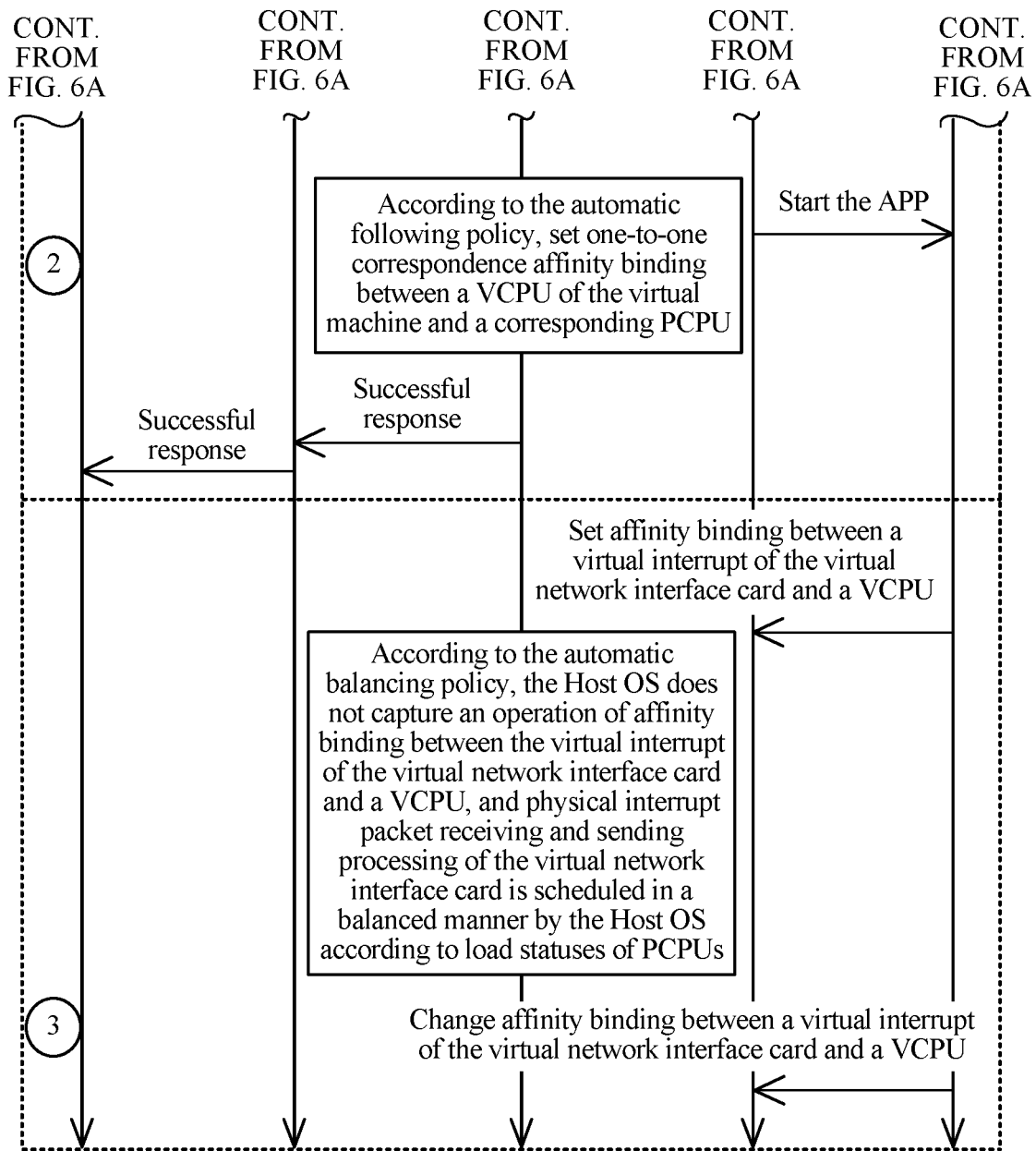

When an affinity policy parameter is set as an automatic balancing policy, an interrupt affinity policy parameter of a virtual network interface card indicates balanced scheduling of a PCPU for processing a physical interrupt. A method for affinity binding of an interrupt of a virtual network interface card is shown in FIG. 6A and FIG. 6B and mainly includes steps ①, ②, and ③, which are specifically as follows:

Step ① mainly includes the following three substeps:

A service resource management system initiates a virtual machine resource request, where an interrupt affinity policy parameter of a virtual network interface card in the virtual machine resource request is automatic balancing.

After receiving the request, an IaaS resource management system finds a computer device that meets a resource requirement, and initiates a request for creating a virtual machine to a Host OS that runs on the computer device, where the request carries an automatic balancing interrupt affinity policy of the virtual network interface card.

The Host OS records the automatic balancing affinity policy of the virtual network interface card of the corresponding virtual machine, and disables an automatic capturing function, so that an operation of setting, by a Guest OS in the virtual machine, affinity binding of a virtual interrupt of the virtual network interface card cannot be captured.

Step ② mainly includes the following two substeps:

The service resource management system initiates a request for starting the virtual machine, and after receiving the request, the IaaS resource management system initiates a request for starting the corresponding virtual machine to a Host OS that runs on a corresponding computer device.

Figure 7:
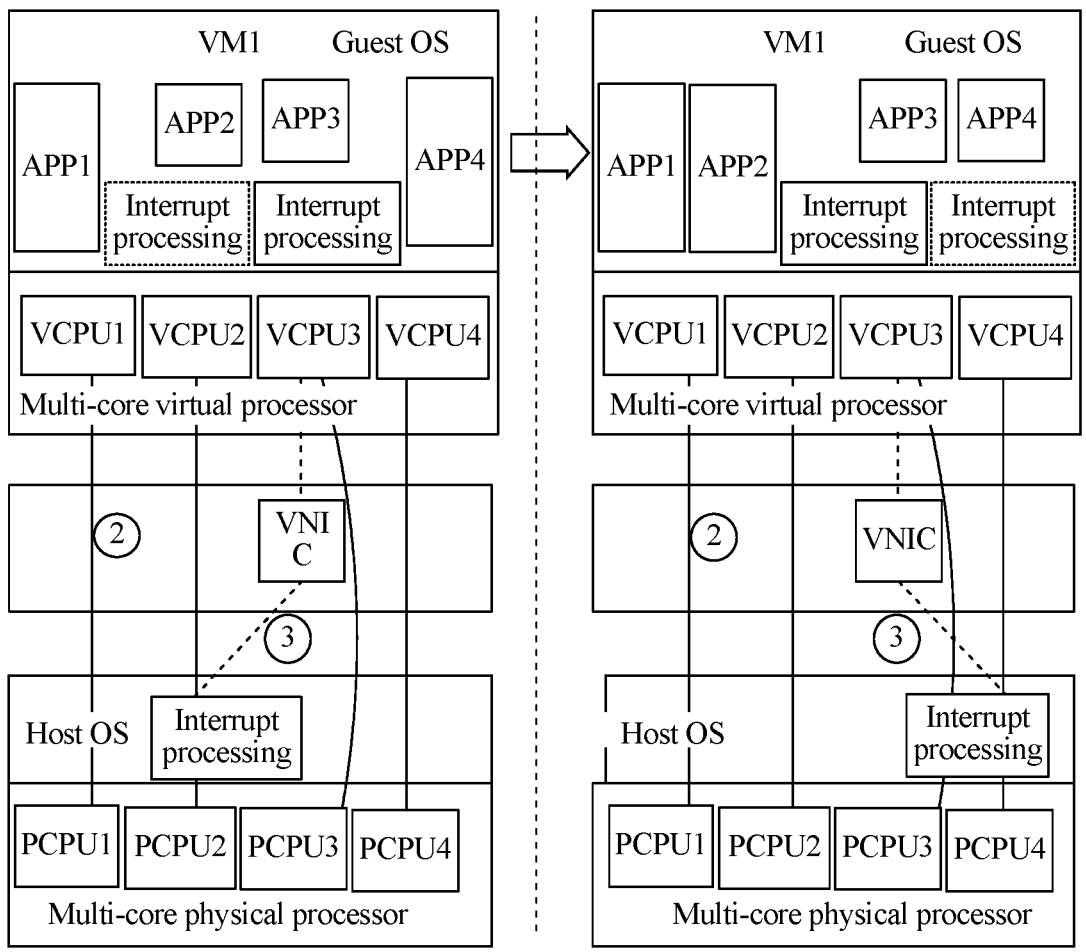
FIG. 7 is schematic block diagram of affinity binding of an interrupt of a virtual network interface card according to Embodiment 2 of the present invention.

After the virtual machine is started, the Guest OS runs, and after the Guest OS runs, an APP runs, where after the virtual machine is started, the Host OS automatically sets one-to-one correspondence affinity binding between a VCPU of the virtual machine and a corresponding PCPU (as shown in FIG. 7, one-to-one correspondence affinity binding is respectively performed between VCPU1 to VCPU4 and PCPU1 to PCPU4).

Step ③ mainly includes the following two substeps:

The Guest OS that runs on the virtual machine sets affinity binding between the virtual interrupt of the virtual network interface card and a VCPU, or changes affinity binding between the virtual interrupt of the virtual network interface card and a VCPU.

The Host OS disables, according to the automatic balancing policy, the automatic capturing function, so that an operation of setting or changing, by the Guest OS in the virtual machine, the affinity binding of the virtual interrupt of the virtual network interface card is not captured. The Host OS automatically schedules, in a balanced manner, the physical interrupt of the virtual network interface card according to load statuses of PCPUs on which virtual machines are located, and dynamically binds the physical interrupt of the virtual network interface card to a less loaded or idle PCPU.

Step ③ may be indicated by using a schematic block diagram in FIG. 7, and ② and ③ in the figure are respectively corresponding to the foregoing steps ② and ③, where when a PCPU2 on which an APP2 is located is less loaded, the Host OS performs affinity binding between a physical interrupt that is of the virtual network interface card and corresponding to an APP3, and the PCPU2; as shown in the right figure (on the right of the dotted line in the figure) of the figure, after a period of time, when the PCPU2 on which the APP2 is located becomes busy and a PCPU4 on which an APP4 is located becomes idle, the Host OS performs affinity binding between a physical interrupt that is of the virtual network interface card and corresponding to the APP3, and the PCPU4.

In contrast to an automatic following policy, a Host OS does not capture an operation of affinity binding between a virtual interrupt of a virtual network interface card and a VCPU, and a physical interrupt of the virtual network interface card is automatically scheduled in a balanced manner by the Host OS according to load statuses of PCPUs, so that an idle PCPU can be utilized more flexibly to avoid a waste of PCPU resources.

Embodiment 3

Figure 8A:
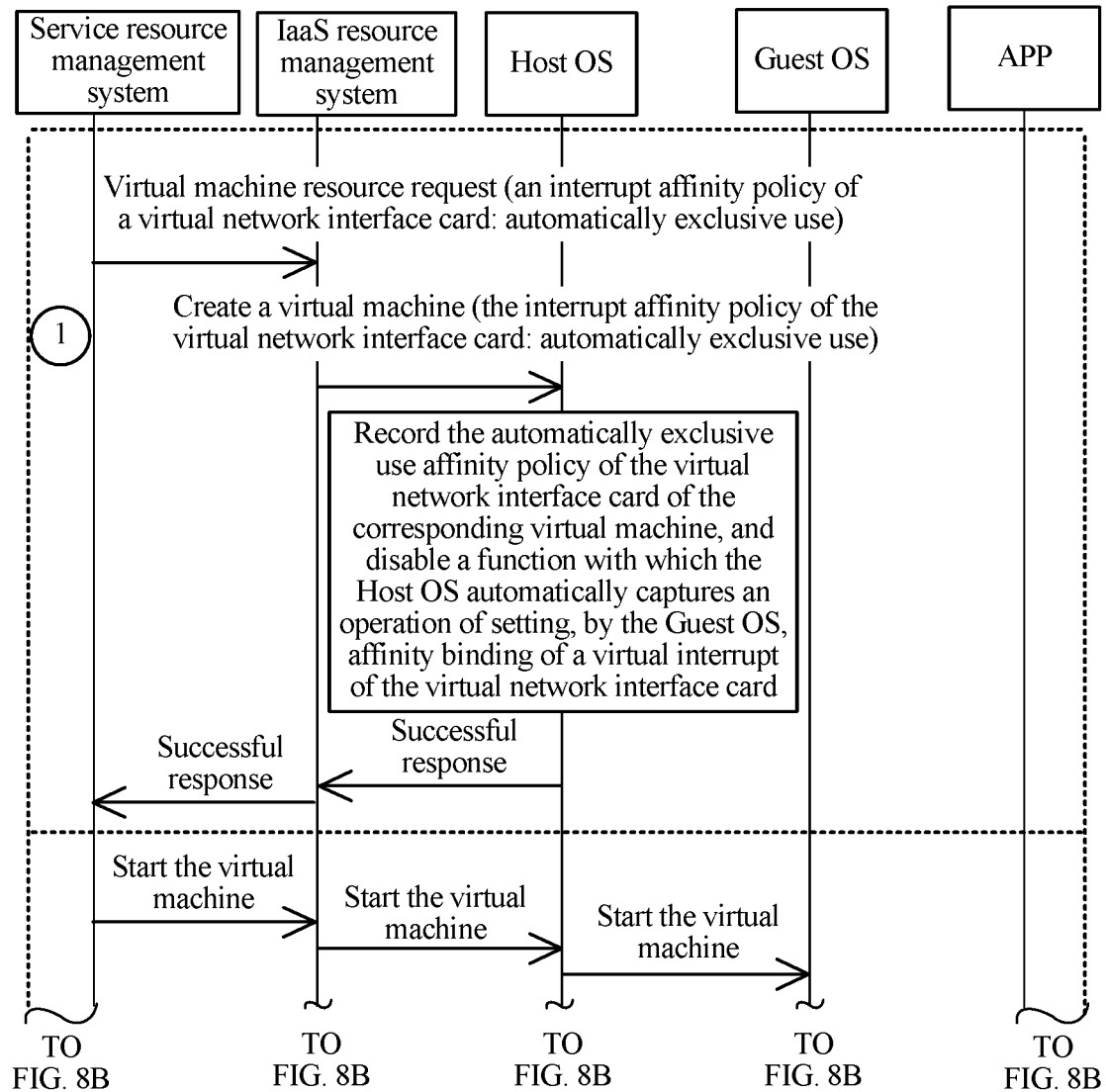
FIG. 8A and FIG. 8B are a flowchart of affinity binding of an interrupt of a virtual network interface card according to Embodiment 3 of the present invention.
Figure 8B:
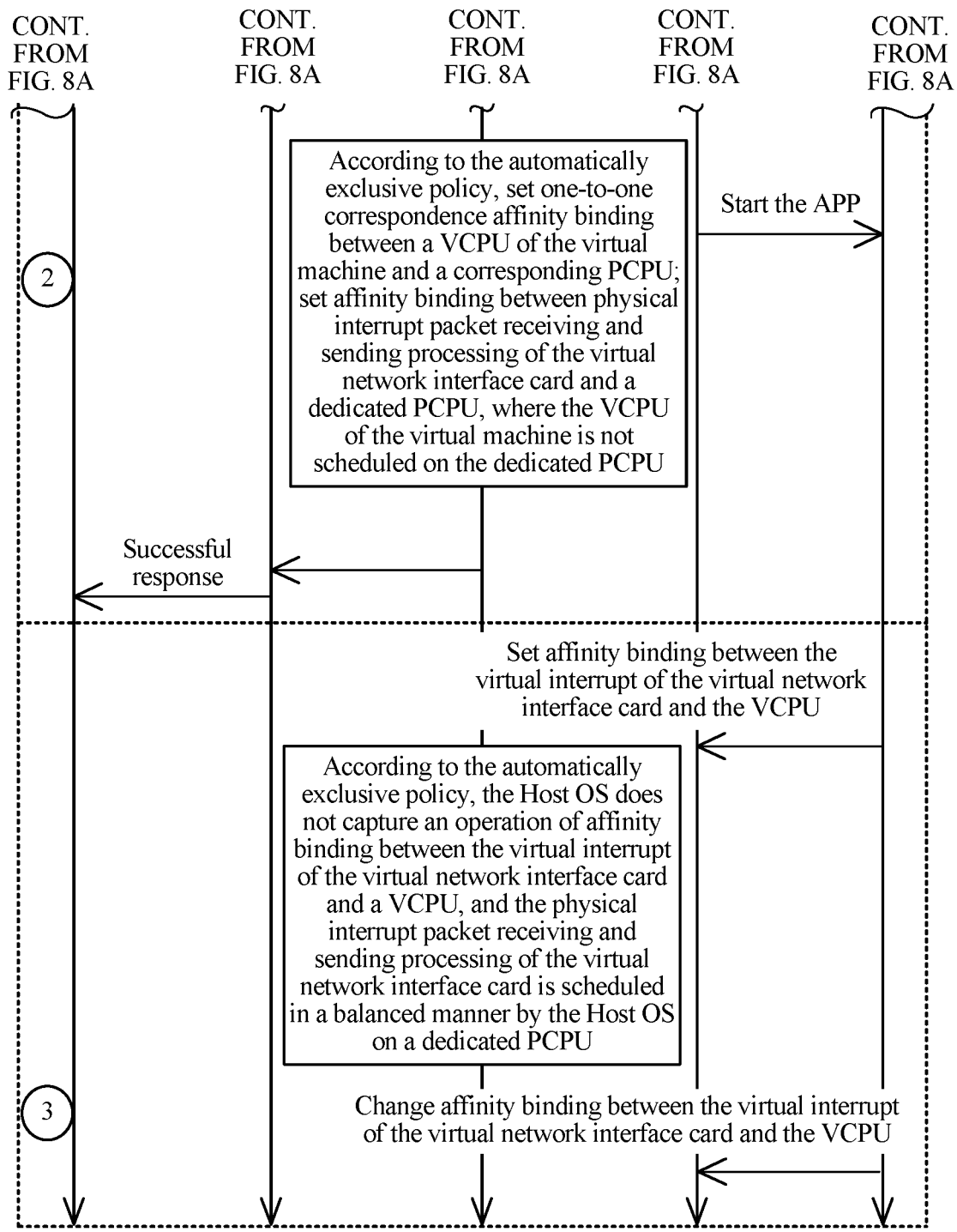

When an affinity policy parameter is set as an automatically exclusive policy, an interrupt affinity policy parameter of a virtual network interface card indicates that there is a reserved PCPU to process a physical interrupt. A method for affinity binding of an interrupt of a virtual network interface card is shown in FIG. 8A and FIG. 8B and mainly includes steps ①, ②, and ③, which are specifically as follows:

Step ① mainly includes the following three substeps:

A service resource management system initiates a virtual machine resource request, where an interrupt affinity policy parameter of a virtual network interface card in the virtual machine resource request is automatically exclusive use.

After receiving the request, an IaaS resource management system finds a computer device that meets a resource requirement, and initiates a request for creating a virtual machine to a Host OS that runs on the computer device, where the request carries the automatically exclusive use interrupt affinity policy of the virtual network interface card.

The Host OS records the automatically exclusive use affinity policy of the virtual network interface card of the corresponding virtual machine, and disables an automatic capturing function, so that an operation of setting, by a Guest OS in the virtual machine, affinity binding of a virtual interrupt of the virtual network interface card cannot be captured.

Step ② mainly includes the following two substeps:

The service resource management system initiates a request for starting the virtual machine, and after receiving the request, the IaaS resource management system initiates a request for starting the corresponding virtual machine to a Host OS that runs on a corresponding computer device.

Figure 9:
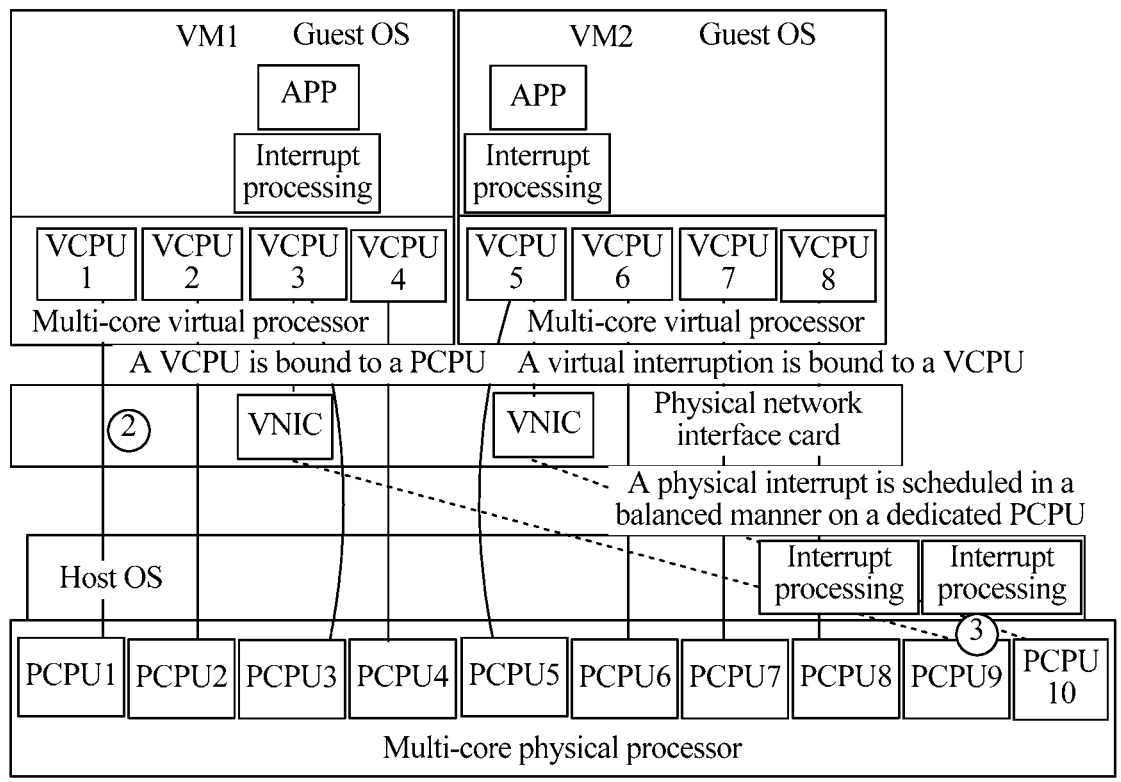
FIG. 9 is schematic block diagram of affinity binding of an interrupt of a virtual network interface card according to Embodiment 3 of the present invention.

After the virtual machine is started, the Guest OS runs, and after the Guest OS runs, an APP runs, where after the virtual machine is started, the Host OS automatically sets one-to-one correspondence affinity binding between a VCPU of the virtual machine and a corresponding PCPU (as shown in FIG. 9, one-to-one correspondence affinity binding is respectively performed between VCPU1 to VCPU4 and PCPU1 to PCPU4).

Step ③ mainly includes the following two substeps:

The Guest OS that runs on the virtual machine sets affinity binding between the virtual interrupt of the virtual network interface card and a VCPU, or changes affinity binding between the virtual interrupt of the virtual network interface card and a VCPU.

The Host OS disables, according to the automatically exclusive policy, the automatic capturing function, so that an operation of setting or changing, by the Guest OS in the foregoing virtual machine, the affinity binding of the virtual interrupt of the virtual network interface card is not captured; and the Host OS performs affinity binding between the physical interrupt of the virtual network interface card and a reserved PCPU that is used to process the physical interrupt of the virtual network interface card.

Step ③ may be indicated by using a schematic block diagram in FIG. 9, where a PCPU9 and a PCPU10 are PCPUs that are dedicatedly reserved for the physical interrupt of the virtual network interface card, and a VCPU on the virtual machine is not scheduled on the PCPU9 and the PCPU10, so that a physical interrupt corresponding to the virtual network interface card is scheduled exclusively on these dedicated processors.

Similar to the solutions in Embodiment 2, a Host OS does not capture an operation of affinity binding between a virtual interrupt of a virtual network interface card and a VCPU, a VCPU of a virtual machine may not be scheduled on a dedicated PCPU, and a physical interrupt of the virtual network interface card is bound to the dedicated PCPU, thereby simplifying a scheduling operation and avoiding interference to an APP that runs on another VCPU.

Embodiment 4

Figure 10:
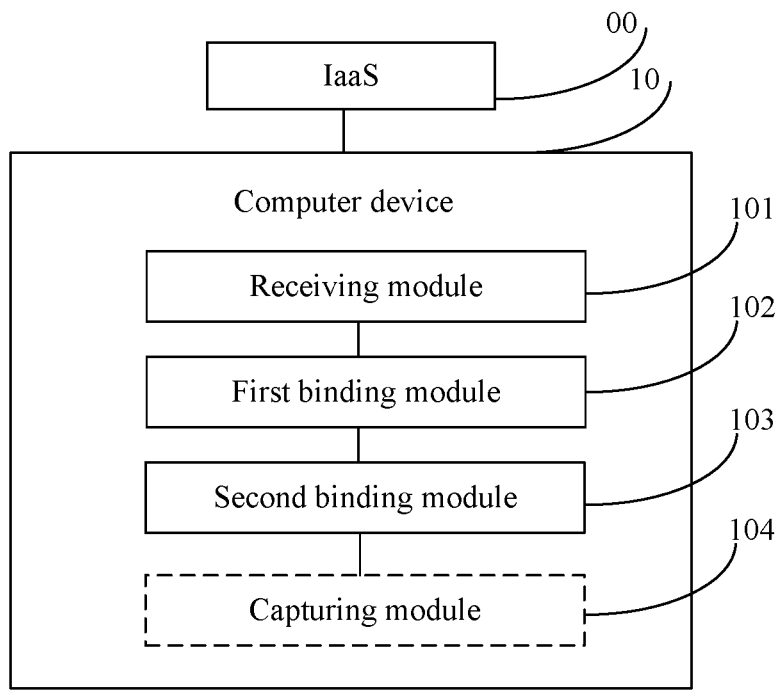
FIG. 10 is a schematic diagram of an internal structure of a computer device according to Embodiment 4 of the present invention.

FIG. 10 shows a diagram of an internal structure of a computer device 10, including:

a receiving module 101, configured to receive a request message sent by an IaaS resource management system 00, where the request message carries an interrupt affinity policy parameter of a virtual network interface card;

a first binding module 102, configured to: perform one-to-one correspondence affinity binding between multiple virtual central processing units VCPUs and multiple physical central processing units PCPUs; and perform affinity binding between a virtual interrupt of the virtual network interface card and a VCPU; and a second binding module 103, configured to: after the first binding module 102 performs affinity binding between the virtual interrupt of the virtual network interface card and the VCPU, perform affinity binding between a physical interrupt of the virtual network interface card and a corresponding PCPU according to the affinity policy parameter.

Further, the computer device further includes a capturing module 104, configured to: capture an operation of performing, by the first binding module 102, affinity binding between the virtual interrupt of the virtual network interface card and the VCPU or changing the affinity binding; and instruct the second binding module 103 to perform affinity binding between the physical interrupt of the virtual network interface card and the corresponding PCPU.

Specifically, the second binding module 103 is configured to perform affinity binding between the physical interrupt of the virtual network interface card and the corresponding PCPU according to a notification of the capturing module 104, where the corresponding PCPU is a PCPU in one-to-one correspondence affinity binding with the VCPU; or the second binding module 103 performs affinity binding between the physical interrupt of the virtual network interface card and an idle PCPU; or the second binding module 103 performs affinity binding between the physical interrupt of the virtual network interface card and a reserved PCPU that is used to process the physical interrupt of the virtual network interface card.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A method for affinity binding of an interrupt of a virtual network interface card, wherein the method comprises:
   receiving, by a computer device, a request message from an Infrastructure as a Service (IaaS) resource management system, wherein the request message carries an interrupt affinity policy parameter of the virtual network interface card;
   enabling a capturing module included in a host operating system executed by the computer device based on the interrupt affinity policy parameter, wherein the capturing module is configured to, when enabled, capture an operation executed by a guest operating system of a virtual machine for performing an affinity binding of a virtual interrupt of the virtual network interface card and a first virtual central processing unit (CPU);
   performing, by the computer device and in response to the capturing module being enabled, affinity binding between a physical interrupt of the virtual network interface card and a first physical CPU, wherein the first virtual CPU is in affinity binding with the first physical CPU;
   processing interrupts of the virtual network interface card; and
   performing affinity binding between the physical interrupt of the virtual network interface card and a second physical CPU in response to the capturing module detecting the virtual interrupt of the virtual network interface card changing to be in affinity binding with a second virtual CPU, wherein the second virtual CPU is in affinity binding with the second physical CPU.

2. The method according to claim 1, wherein performing the affinity binding between the physical interrupt of the virtual network interface card and the first physical CPU further comprises:
   finding a corresponding physical interrupt number according to a virtual interrupt number of the virtual network interface card; and
   determining the first physical CPU according to the affinity binding between the first virtual CPU and the first physical CPU.

3. The method according to claim 1, wherein performing the affinity binding between the physical interrupt of the virtual network interface card and the second physical CPU further comprises:
   finding a corresponding physical interrupt number according to a virtual interrupt number of the virtual network interface card; and
   determining the second physical CPU according to the affinity binding between the second virtual CPU and the second physical CPU.

4. A computer device comprising:
   a non-transitory memory comprising processor-executable instructions; and
   one or more processors in communication with the memory, wherein the one or more processors are configured to execute the processor-executable instructions to facilitate:
      receiving a request message from an Infrastructure as a Service (IaaS) resource management system, wherein the request message carries an interrupt affinity policy parameter of a virtual network interface card;
      enabling a capturing module included in a host operating system based on the interrupt affinity policy parameter, wherein the capturing module is configured to, when enabled, capture an operation executed by a guest operating system of a virtual machine for performing an affinity binding of a virtual interrupt of the virtual network interface card and a first virtual central processing unit (CPU);
      performing affinity binding between a physical interrupt of the virtual network interface card and a first physical CPU in response to the capturing module being enabled, wherein the first virtual CPU is in affinity binding with the first physical CPU;
      processing interrupts of the virtual network interface card; and
      performing affinity binding between the physical interrupt of the virtual network interface card and a second physical CPU in response to the capturing module detecting the virtual interrupt of the virtual network interface card changing to be in affinity binding with a second virtual CPU, wherein the second virtual CPU is in affinity binding with the second physical CPU.

5. The computer device according to claim 4, wherein the one or more processors are further configured to execute the processor-executable instructions to facilitate:
   capturing, when the capturing module is enabled, an operation of performing affinity binding between the virtual interrupt of the virtual network interface card and one of multiple virtual CPUs.

6. A non-transitory memory storage comprising processor-executable instructions, that when executed by a processor, cause the processor to facilitate:
   receiving a request message from an Infrastructure as a Service (IaaS) resource management system, wherein the request message carries an interrupt affinity policy parameter of a virtual network interface card;
   enabling a capturing module included in a host operating system based on the interrupt affinity policy parameter, wherein the capturing module is configured to, when enabled, capture an operation executed by a quest operating system of a virtual machine for performing an affinity binding of a virtual interrupt of the virtual network interface card and a first virtual central processing unit (CPU);
   performing affinity binding between a physical interrupt of the virtual network interface card and a first physical CPU in response to the capturing module being enabled, wherein the first virtual CPU is in affinity binding with the first physical CPU;
   processing interrupts of the virtual network interface card; and
   performing affinity binding between the physical interrupt of the virtual network interface card and a second physical CPU in response to the capturing module detecting the virtual interrupt of the virtual network interface card changing to be in affinity binding with a second virtual CPU, wherein the second virtual CPU is in affinity binding with the second physical CPU.

7. The non-transitory memory according to claim 6, wherein the processor-executable instructions further include instructions for a processor to facilitate:
   capturing, when the capturing module is enabled, an operation of performing affinity binding between the virtual interrupt of the virtual network interface card and one of multiple virtual CPUs.

* * * * *

UNITED STATES PATENT AND TRADEMARK OFFICE
CERTIFICATE OF CORRECTION

PATENT NO. : 10,768,960 B2
APPLICATION NO. : 15/187458
DATED : September 8, 2020
INVENTOR(S) : Xia Page 1 of 1

It is certified that error appears in the above-identified patent and that said Letters Patent is hereby corrected as shown below:

On the Title Page

Item (56) Foreign Patent Documents, Citation No. 1: "CN 101051266 A 8/2007" should read -- CN 101051266 A 10/2007 --.

In the Claims

Claim 6, Column 12, Line 39: "enabled, capture an operation executed by a quest" should read -- enabled, capture an operation executed by a guest --.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*